United States Patent [19]

Stoutenburg et al.

[11] Patent Number: 5,011,068
[45] Date of Patent: Apr. 30, 1991

[54] AUTOMOTIVE BODY FRAMING SYSTEM

[75] Inventors: Robert R. Stoutenburg, South Lyon; Michael R. Dugas, Brighton; Mark W. Hazelton, West Bloomfield, all of Mich.

[73] Assignee: Progressive Tool & Industries Co., Soughfield, Mich.

[21] Appl. No.: 446,131

[22] Filed: Dec. 5, 1989

[51] Int. Cl.⁵ .................................................. B23K 37/04
[52] U.S. Cl. ...................................... 228/4.1; 228/49.1
[58] Field of Search .......................... 228/4.1, 6.1, 44.3, 228/47, 49.1; 219/79, 158

[56] References Cited

U.S. PATENT DOCUMENTS

| | | |
|---|---|---|
| 4,256,947 | 3/1981 | De Candia . |
| 4,392,601 | 7/1983 | Fajikawa et al. . |
| 4,400,607 | 8/1983 | Walou et al. . |
| 4,404,451 | 9/1983 | Niikawa et al. . |
| 4,442,335 | 4/1984 | Rossi . |
| 4,483,476 | 11/1984 | Fajikawa et al. . |
| 4,494,687 | 1/1985 | Rossi . |
| 4,535,927 | 8/1985 | Matsubara et al. . |
| 4,548,346 | 10/1985 | Kraus et al. . |
| 4,573,626 | 3/1986 | Nishiyama . |
| 4,600,136 | 7/1986 | Sciaky et al. . |
| 4,606,488 | 8/1986 | Yanagisaua; . |
| 4,609,137 | 9/1986 | De Filippis . |
| 4,629,109 | 12/1986 | Matsushita . |
| 4,659,895 | 4/1987 | Di Rosa . |
| 4,667,866 | 5/1987 | Tobita et al. . |
| 4,670,961 | 6/1987 | Fontaine et al. . |
| 4,678,110 | 7/1987 | Handa . |
| 4,693,358 | 9/1987 | Kondo et al. . |
| 4,719,328 | 1/1988 | Yanagisana et al. . |
| 4,734,979 | 4/1988 | Sakamoto et al. . |
| 4,738,387 | 4/1988 | Jaufmann et al. . |
| 4,740,133 | 4/1988 | Kawano . |
| 4,744,500 | 5/1988 | Hatakeyama et al. . |
| 4,751,995 | 6/1988 | Naruse et al. . |
| 4,767,046 | 8/1988 | Kumasai et al. . |
| 4,779,787 | 10/1988 | Naruse et al. . |
| 4,795,075 | 1/1989 | Pigott et al. . |
| 4,796,200 | 1/1989 | Pryor . |
| 4,800,249 | 1/1989 | Di Rosa . |
| 4,813,587 | 3/1989 | Kadowaki et al. . |
| 4,856,698 | 8/1989 | Marianne et al. ............... 228/4.1 |
| 4,856,701 | 8/1989 | Pöckl ............................. 228/49.1 |
| 4,905,884 | 3/1990 | Alborante et al. ............. 228/4.1 |

*Primary Examiner*—Sam Heinrich
*Attorney, Agent, or Firm*—Basile and Hanlon

[57] ABSTRACT

An automotive body framing system includes a clamping frame assembly for accurately positioning and clamping loosely assembled main body panels and header members in accurate alignment with each other to be welded into a rigid permanently assembled relationship. The loosely assembly panels and members are mounted upon a conveying sled upon which the floor panel of the assembly is accurately located. A clamping frame assembly including front and rear frame sections pivotally connected in end-to-end relationship with each other is movable into a clamping position overlying the body from front to rear and supported in an inverted V configuration by support posts which support the front and rear ends of the frame assembly. Clamps mounted on the front and rear frame sections are actuable to clamp the various components in accurately assembled relationship to each other while leaving the entire opposite sides of the body accessible to welding devices. In one form of the invention, the clamping frame and support parts are mounted upon the move with the conveying sled. In another form of the invention, the clamping frame and support posts are located at a welding station and the body is conveyed by the sled to and from the operative relationship with the clamping frame.

10 Claims, 3 Drawing Sheets

AUTOMOTIVE BODY FRAMING SYSTEM

BACKGROUND OF THE INVENTION

The present invention is directed to a production line framing system for accurately locating major panels of a unitized automobile body relative to each other for the initial welding of these panels into their permanently assembled relationship to each other.

The construction of a so called unitized automobile body commences with the formation of individual major panels by stamping the panels from a sheet metal blank. Typically, these major panels include a floor panel, right and left body side panels, a fire wall and either a roof panel or transversely extending header members upon which a roof panel is subsequently mounted. After the individual panels are stamped, some preliminary assembly operations may be performed on the individual panels as, for example, adding door hinge and latch hardware to the body side panels at appropriate locations on the door opening, adding seat mounting brackets and reinforcements to the floor panel, etc.

A set of panels which are to constitute a subassembly of the finished vehicle body are then brought together and loosely assembled to each other. This initial loose assembly frequently is accomplished by a so called toy tab arrangement in which one panel is formed with a tab projecting from one edge which is received in a slot in an adjacent panel. This technique interlocks the panels and frame members to each other to the point where they will not separate from each other, but does not achieve a rigid assembly—that is, for example, the side panels may tilt slightly relative to the floor panel. The loosely assembled subassembly is then brought to a welding station which welds the various panels and frame members to each other into a rigid permanently assembled relationship.

This initial welding step is one of the most important steps in the assembly of the body because it establishes the final assembled alignment of the various panels and headers to each other and an accurate and precise alignment is essential to further assembly steps performed on the subassembly by automated tooling at subsequent stations along the production line. It is thus essential that the various panels and headers by precisely and accurately located relative to one another and held fixedly in the desired positions during the welding operation. The positioning of the various panels and header members during the welding operation is accomplished by clamping frames which carry a plurality of individual clamps arranged to clamp the various body components in the desired position.

Most present day body framing lines employ robotic welders which can be programmed to perform several welds at different locations on the body during one welding operation. The welders typically are located at opposite sides of the conveying line at the welding station, and when the body subassembly is located at the welding station, the head of one welder may, for example, be extended to pass through the door opening to apply several tack welds along the seam between a body side panel and floor panel. In those cases where the clamping frames are positioned at opposite sides of the body, see, for example, DeCandia U.S. Pat. No. 4,162,387, clearance problems may restrict motion of the welding head which must past through the clamping frame before it has access to the body. This can require the performance of a portion only of the required welding at one station and the advancement of the partially welded subassembly to a second station where a different clamping frame provides access of the welding head to portions of the assembly which could not be reached by the heads at the first station.

A second problem which arises where separate clamping frames are employed at opposite sides of the body is that the two frames must be independently located in a predetermined relationship to each other and to the position occupied by the body which the frames are to clamp.

In U.S. Pat. No. 4,670,961, front and rear clamping frames are carried by rotary magazines into positions above the front and rear portions of a vehicle body and are then lowered into an operating position in overlying relationship to the body to clamp the various panels. This arrangement reduces the clearance problem discussed above. However, like the system referred to above in which two independent clamping frames were respectively employed at the opposite sides of the vehicle body, the system of U.S. Pat. No. 4,670,961 likewise requires that two separate frames be independently located relative to the body and to each other.

The present invention is directed to a clamping system which, when located in operative relationship with the vehicle body, overlies the body to leave the sides of the body free of obstructions to movement of the welding heads, and which requires the alignment of only a single frame assembly with the body.

SUMMARY OF THE INVENTION

Two embodiments of a framing system embodying the present invention are disclosed, both of which employ a clamping frame having front and rear frame sections coupled to each other in end-to-end relationship for pivotal movement relative to each other about a horizontal axis. When in a clamping position, the clamping frame overlies the vehicle body to be clamped with the front and rear frame sections inclined downwardly from the pivot axis in an inverted V-shaped configuration above the front and rear portions of the vehicle body. When in the clamping or operative position, clamps mounted upon the respective clamping frame sections engage the body side panels and fire wall along their respective upper edges and other clamps engage header members to fixedly locate these members in position. The lower portions of the body side panels and fire wall are temporarily coupled to the floor panel which, in both embodiments, is in turn fixedly mounted on a sled which is driven along a conveyor to convey the body from one work station to the next.

In one embodiment, the clamping frame is mounted directly upon the sled, and the sled, body subassembly, and clamping frame move as a unit to and from the welding station. In this embodiment, the loosely assembled body is loaded upon the sled at a loading station upstream of the conveyor line from the welding station. During the loading operation, the clamping frame is elevated to a transfer position spaced above the sled by a distance sufficient to provide adequate clearance for loading the loosely assembled body onto the sled from one side of the conveyor. This elevating of the clamping frame is performed by pneumatic lift motors permanently located at the loading station whose piston rods, when extended, engage suitably located abutments on the clamping frame to lift the frame upwardly from the sled to its transfer position. After the body has been loaded upon the sled, the lift motors are retracted to lower the clamping frame to its operative clamping position in which it is supported upon support posts on the sled. At this time, the clamps on the clamping frame are actuated to clamp the side panels, fire wall, and header members in position.

The sled, clamping frame and clamped body are then advanced by the conveyor to the welding station, located in the desired position relative to the welders, and the welding operation performed. Upon completion of the welding operation, the welding heads are retracted, and the sled, clamping frame and body are then advanced as a unit to an unloading station. Upon arrival at the unloading station, the clamps are released, and pneumatic lift motors similar to those employed at the loading station are actuated to lift the clamping frame to its transfer position well clear of the body which is then removed from the sled to one side of the conveyor.

In a second embodiment of the invention, the clamping frame is suspended above the conveyor at the welding station by a suspension arrangement which enables the frame to be raised and lowered between a transfer position spaced clear above the path of movement of the body along the conveyor line and an operating position in which the clamping frame is lowered into operative relationship with a body at the welding station.

In this second embodiment, the loosely assembled body is located on the sled at the loading station and then conveyed by the sled to the welding station. Upon arrival of the sled and loosely assembled body at the welding station, the clamping frame is lowered to its operating position in which it is supported upon fixed support posts located at opposite side of the conveyor, and the clamps on the frame are actuated to fixedly clamp the various panels and header members in position for welding. At the conclusion of the welding operation, the clamps are released and the clamping frame is again raised to its transfer position. At this time, the sled and welded body are advanced to the next station on the conveyor line.

In both embodiments, the clamping frame, when in its clamping position is gravitationally supported at its front and rear ends by rigid locating members which project horizontally outwardly from opposite sides of the frame adjacent the front and rear ends of the frame. Rigid support posts in the first described embodiment are mounted upon the sled and formed with V-shaped notches in their upper ends which receive their locating members on the clamping frame when the frame is in its clamping position.

In the second described embodiment, the support posts are mounted at fixed locations at the welding station at opposite sides of the conveyor.

In both cases, the clamping frame is held in its clamping position simply by the force of gravity. The pivotal connection between the front and rear sections of the clamping frame minimizes the distance the entire frame must be lifted to a transfer position clear of the body by permitting the front and rear ends of the frame to swing upwardly about the pivot axis between the two frame sections. Since the front and rear ends of the frame are fixedly located by the support posts when the frame is in its clamping position, the single pivotal interconnection between the two frame sections rigidly locates the sections in the clamping position.

Other objects and features of the invention will become apparent by reference to the following specification and to the drawings.

DESCRIPTION OF THE PREFERRED EMBODIMENT

Figure 6:
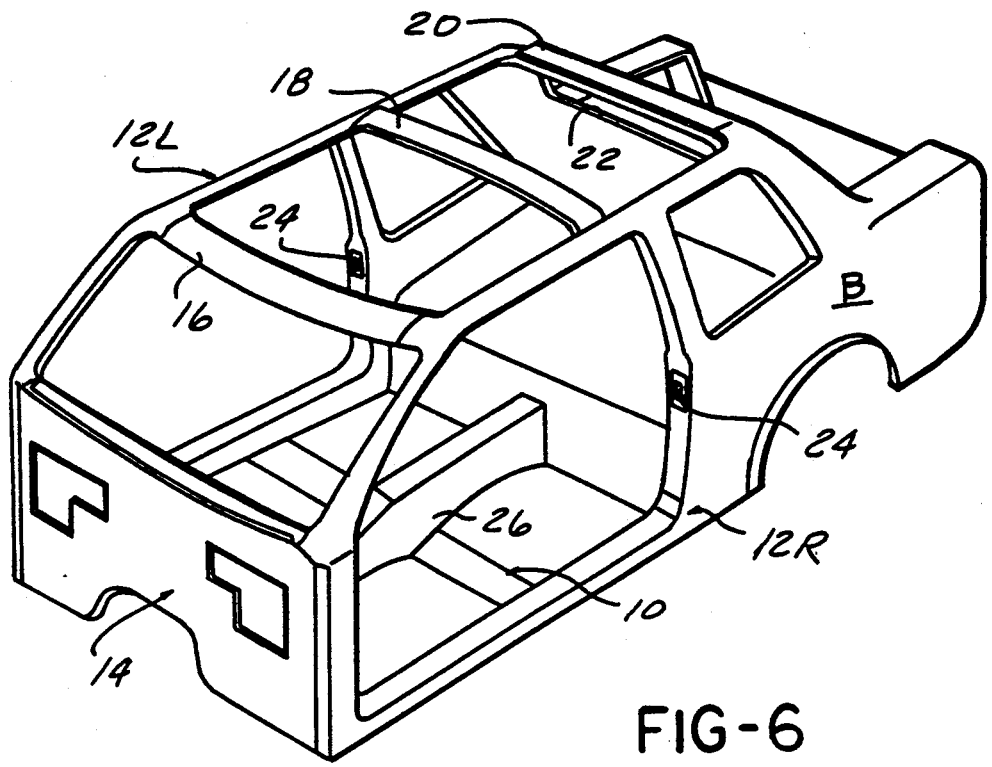
FIG. 6 is a perspective view of a typical body subassembly operated upon by the embodiments of FIGS. 1 and 3.

Referring first to FIG. 6, a typical vehicle body subassembly B handled by the apparatus of the present invention will include a floor panel designated generally 10, right and left body side panels 12R, 12L, a fire wall 14, and various transversely extending header members such as 16, 18, and 22. All of these members are initially stamped from sheet metal, but prior to their assembly to each other in the stage illustrated in FIG. 6, additional preassembly operations, such as the addition of parts, such as latch reinforcements 24 to the body side panel, a drive shaft tunnel 26 to the floor panel, etc.

The various components shown in FIG. 6 typically are initially assembled to each other as by tabs projecting from one panel or header member received in slots in an adjacent panel or member which may be bent to loosely interlock the two adjacent members to each other. While this initial assembly of the panels and header members to each other provides a loose interlocking of the various panels and members sufficient to prevent separation, it does not achieve a structurally rigid assembly. Thus, in order to weld the various components into an accurately aligned permanently assembled rigid inner-relationship, it is necessary that the various panels and header members be accurately located and held in the desired final assembled relationship to each other prior to and during the welding operation. The clamping systems to be described below perform this function.

Figure 1:
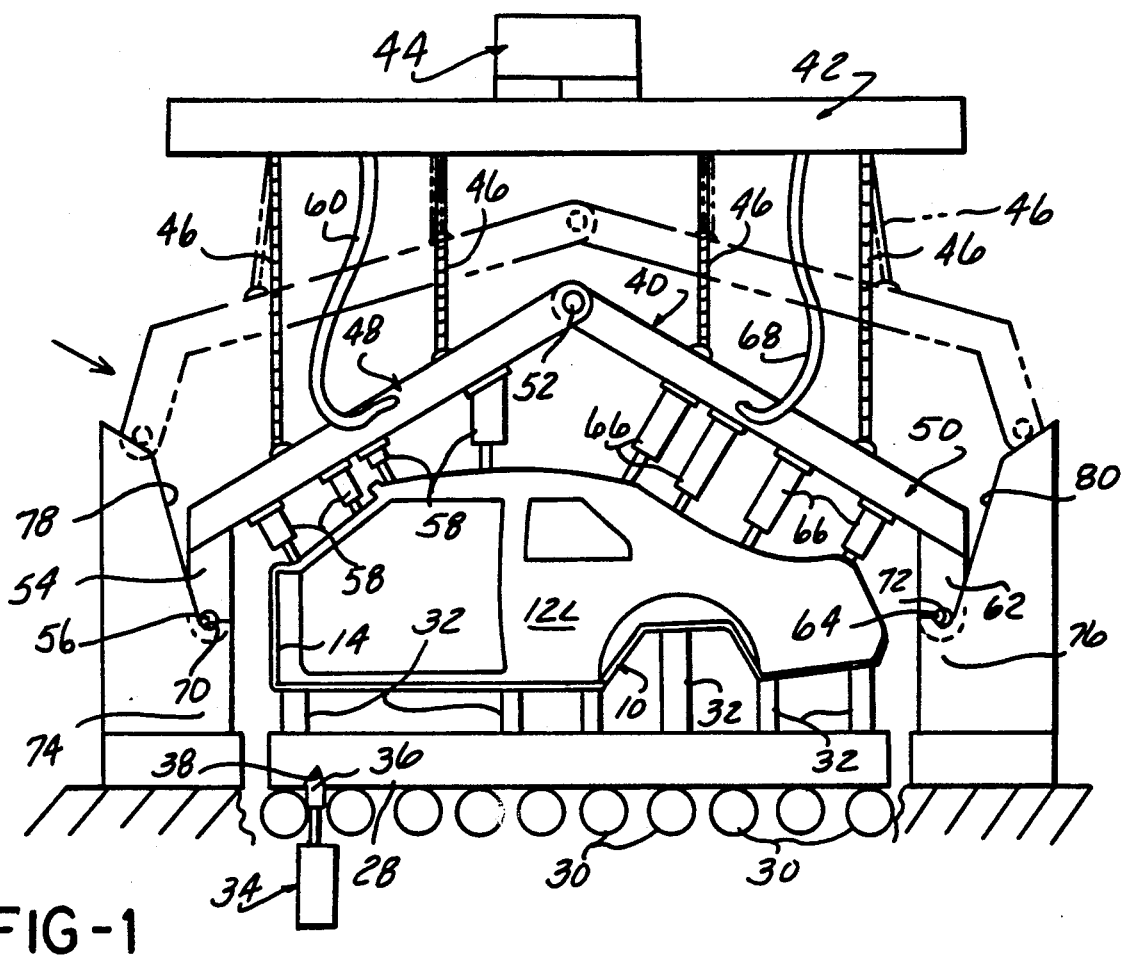
FIG. 1 is a side elevational view of one embodiment of the present invention with certain parts broken away or shown schematically.
Figure 2:
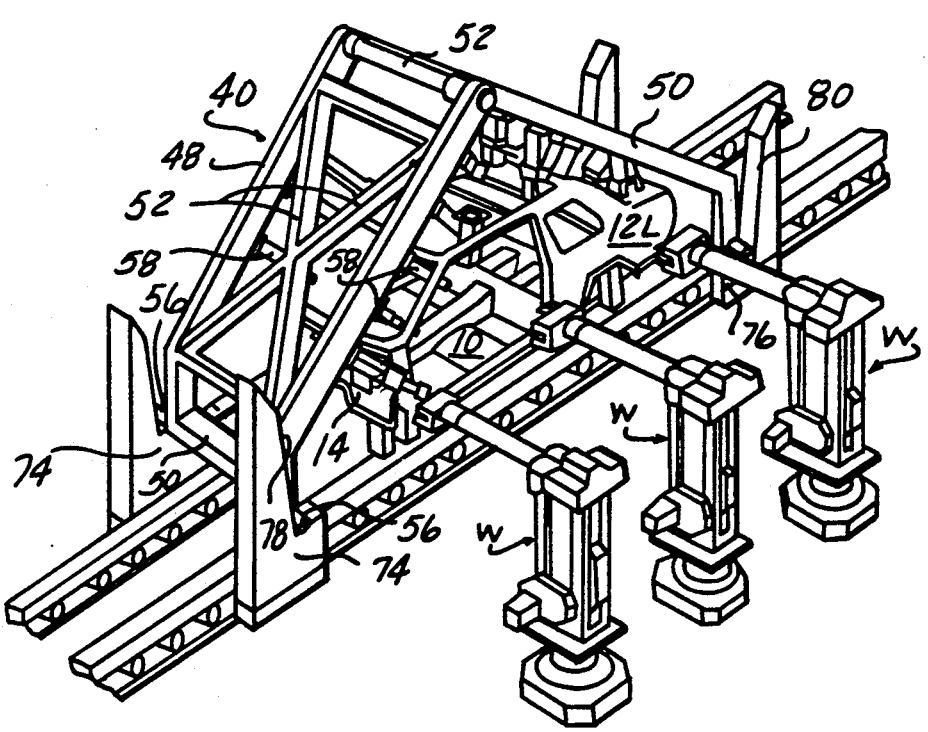
FIG. 2 is a perspective view of the embodiment of FIG. 1 with certain parts omitted.

In the form of the invention shown in FIGS. 1 and 2, the loosely assembled body subassembly B as shown in FIG. 6 is mounted, as best seen in FIG. 1, upon a sled 28 supported for guided movement along a conveyor schematically indicated at 30. A group of rigid locating posts 32 fixedly mounted upon sled 28 support the floor panel 10 of the body subassembly in a fixed position upon sled 28, the posts 32 including locating pins (not shown) seated in locating bores or recesses formed in floor panel 10 to accurately position the floor panel relative to the sled. The body side panels, such as 12L and fire wall 14 are in turn loosely interlocked along their lower edges to the side and front edges of floor panel 10 while the header members are interlocked to and extend transversely between the upper edges of the body side panels. As described above, the initial assembly of the various panels and header members to each other by a so called toy tab arrangement enables the loosely assembled panels and header members to be conveyed by a unit upon sled 28 but does not achieve a completely rigid structure.

In FIGS. 1 and 2, sled 28 and the body subassembly B supported upon the sled are shown located at a welding station at which a plurality of robotic welders W (FIG. 2) are located at opposite side of conveyor 30. In FIG. 2, the welders W are shown only at one side of conveyor 30, however, it will be appreciated that a similar array of welders (not shown) will be located at the opposite side of conveyor 30. Sled 28 is located upon conveyor 30 in the desired relationship to welders W as by a retractable locator or stop schematically shown at 34 in FIG. 1 which may include a locating pin 36 which can be positioned in a corresponding recess 38 in the sled to precisely locate sled 28 longitudinally of conveyor 30 relative to the welding devices W at the welding station.

In the embodiment of FIGS. 1 and 2, when sled 28 is so located by the locating device 34, the body B carried upon the sled is located beneath a clamping frame designated generally 40 which is suspended from an overhead fixed frame designated generally 42 by a power driven suspension system designated generally 44 which may include suspension cables such as 46. The suspension system 44 may take any of several forms. Its function is simply to raise and lower the clamping frame 40 between the clamping position shown in full line in FIG. 1 and an elevated transfer position indicated in broken line in FIG. 1. When frame 40 is in its elevated transfer position, the entire frame is elevated clear of the path of movement of the sled carried body B along conveyor 30 so that the body can be conveyed by the sled to and from the welding position shown in FIG. 1.

Clamping frame 40 includes a front frame section designated generally 48 and a rear frame section 50 coupled in end-to-end relationship with each other by a horizontal pivot pin 52 which accommodates pivotal movement of frame sections 48 and 50 relative to one another about a horizontal axis normal to the direction of movement of the sled and body along conveyor 30. As best seen in FIG. 2, front frame section 48 is a generally rectangular open frame work suitably braced as by cross frame members 52 to be completely rigid. At the front end of frame section 48, a downwardly projecting locating portion 54 is fixedly and rigidly mounted on frame section 48. Rigid cylindrical locating rods 56 are fixedly mounted upon the locating section 54 and project horizontally outwardly from opposite sides of the front frame 48. A plurality of pneumatically actuated clamps, such as 58, are mounted upon the underside of front frame section 48 at locations such that the clamps 58, when actuated, will engage, locate and fixedly clamp the body side panels, fire wall, and header members of the body B in accurately aligned assembled relationship to each other when the clamping frame is the welding position shown in FIG. 1. Air under pressure for actuating the clamps 58 is supplied via a pneumatic supply line such as 60 loosely coupled between the front frame section 48 and the fixed overhead frame 42.

Rear frame section 50 is of substantially similar construction to front frame section 48 and includes a locating section 62 at its rear end formed with outwardly projecting cylindrical locating rods 64. Rear frame section 50 likewise carries a plurality of pneumatically actuated clamps 66 operated via a pneumatic conduit 68.

When clamping frame 40 is in the clamping position shown in full line in FIG. 1, the outwardly projecting locating rods 56 and 64, located respectively at the front and rear ends of frame 40, rest within V-shaped notches 70, 72 in front and rear support post assemblies 74, 76. As best seen in FIG. 2, front support post assemblies 74 are located at opposite sides of conveyor 30 in fixed positions clear of the path of movement of sled 28 and the body subassembly B along conveyor 30. Rear posts 76 are similarly fixedly located at spaced locations on opposite sides of conveyor 30.

When clamping frame 40 is in the clamping position shown in full line in FIG. 1, the entire weight of frame 40 is supported by the support post 74, and the geometry of the frame and the location of the pivotal connection 52 between front frame sections 48 and 50 is such that the frame assembly 40 is rigidly maintained by gravity in the position shown in full line in FIG. 1. The entire frame 40, and the clamps carried by the frame, is thus precisely located as a single unit by the fixedly located support posts 74, 76 which in turn may be precisely located relative to the bases of the welding devices W.

After the sled has been located in the position shown in FIG. 1 by the locating device 34, and the clamping frame 40 lowered to the clamping position shown in full line in FIG. 1, the clamps 58, 66, are actuated to accurately position the various portions of the body assembly engaged by the clamps relative to the clamping frame 40. The welding devices are then actuated to weld the various panels and header members of the body subassembly to each other while these components of the subassembly are fixedly held in position by the clamps. After the welding operation is completed, the clamps 58, 66 are released and clamping frame 40 is elevated by the suspension system 44 upwardly to the position shown in broken line in FIG. 1.

During this elevating movement, the locating rods 56, 64 on the respective front and rear frame sections 48, 50 are guided along cam surfaces 78, 80 respectively formed on support post assemblies 74, 76, the cam surfaces 78, 80 accommodating a slight opening of the front and rear frame sections 48, 50 about their pivotal interconnection 52 so that frame 40 may be positioned clear of the path of movement of the body subassembly along conveyor 30 with a minimum elevation of frame 40. When the clamping frame 40 is located in its elevated or transfer position, the locating device 34 is released so that sled 28 can carry the now welded body subassembly B along conveyor 30 clear of the welding station.

In the embodiment of FIG. 1, a single clamping frame 40 operates upon a series of body assemblies conveyed in succession to the welding station at which the clamping frame is located. This particular arrangement is most practical for use on those lines which are intended to handle only a single body style. Where the main assembly line may be required to assemble more than one body style, individual branch lines employing the clamping frame arrangement of FIG. 1 would be employed for each different body configuration to perform the initial welding step and the body subassemblies so welded on the individual branch lines would then be fed into the main production line.

Figure 3:
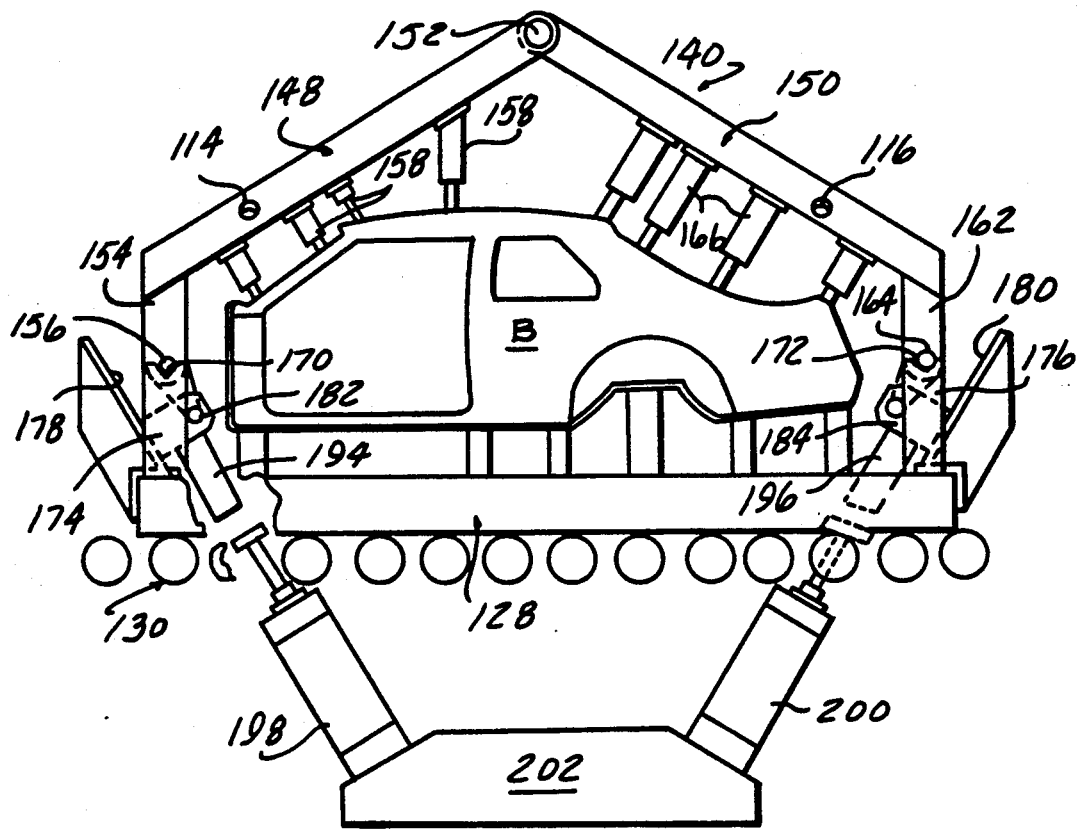
FIG. 3 is a side elevational view of a second embodiment of the invention with certain parts broken away showing the clamping frame in a clamping position.
Figure 5:
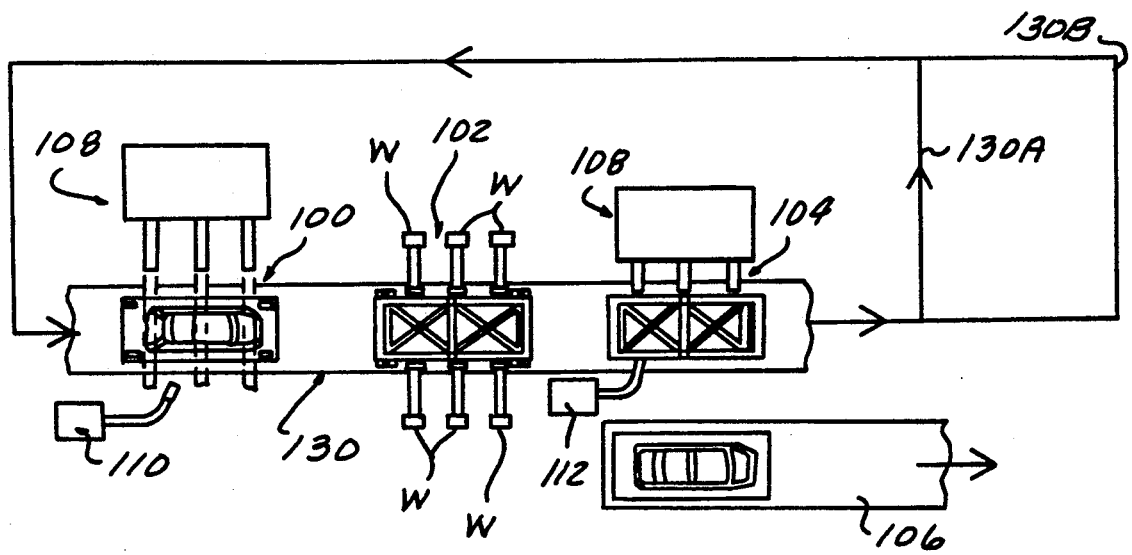
FIG. 5 is a schematic diagram showing a top plan view of portions of a conveyor system utilized with the embodiment of FIGS. 3 and 4.

The embodiment of FIG. 3 differs from that of FIG. 1 in that the clamping frame and support posts are mounted upon and moved as a unit with the sled. Referring to FIG. 5, a schematic diagram of a framing system utilizing the embodiment of FIG. 3 shows a portion of a conveyor 130 operable to convey body subassembly carrying sleds successively to and from a loading station 100, a welding station 102 and an unloading station 104. A loosely assembled body B is loaded upon a sled at loading station 100 and the clamping frame, to be described below, carried by that sled is then actuated to fixedly clamp the various body components into their final assembled relationship. The sled, with its associated clamping frame and clamps engaged is than advanced to welding station 102 where the welding operation is performed. After the welding station, the sled, with the clamped, welded body is advanced to unloading station 104 at which the clamps are released, the clamping frame opened, and the welded body transferred from conveyor 130 to an adjacent conveyor 106. The empty sled and clamping frame are then recirculated along a return section 130A of conveyor 130 which returns the sled and its clamping frame to loading station 100 to repeat the operation. In this arrangement, a plurality of sleds and clamping frames will be employed, and conveyor 130 may feed sleds into or withdraw sleds from a storage section 130B as required.

Figure 4:
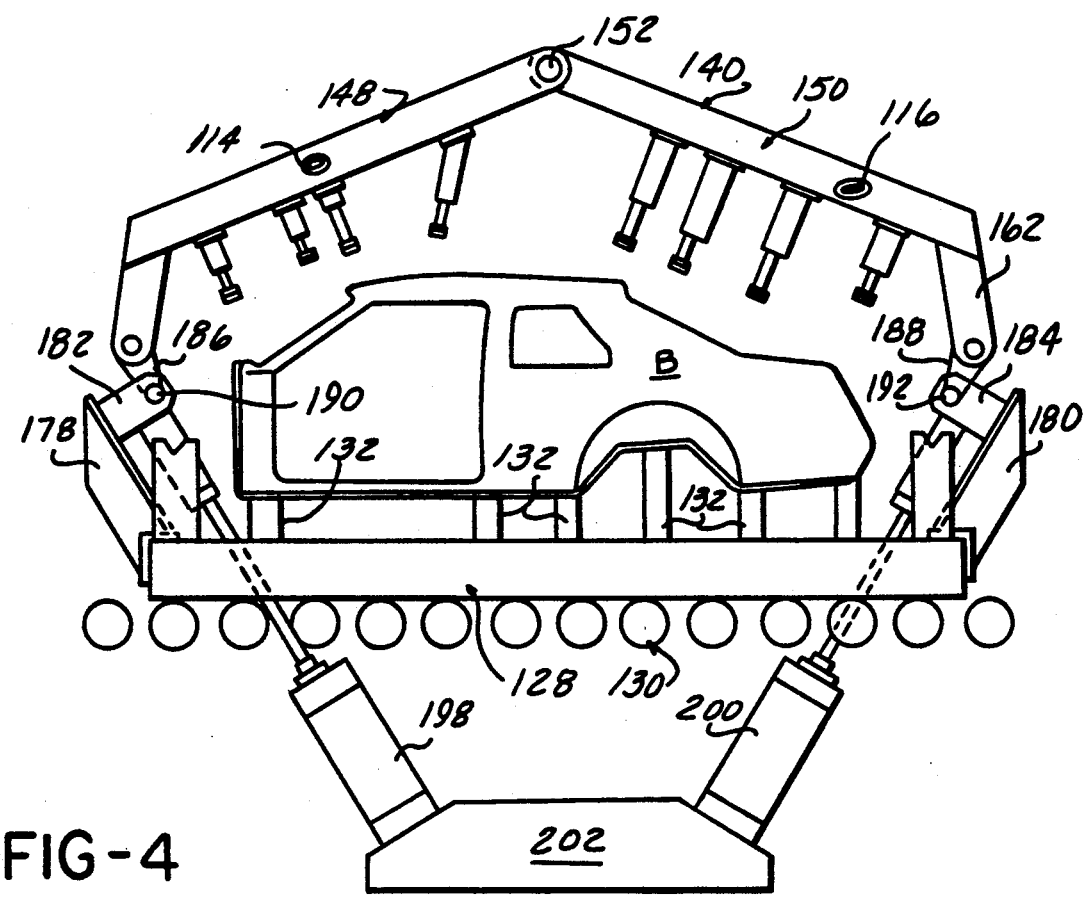
FIG. 4 is a side elevational view of the embodiment of FIG. 3 showing the clamping frame in its open or transfer position.

Referring now to FIGS. 3 and 4, a sled 128 having floor panel support posts 132 similar to those of the previously described embodiment is conveyed along a conveyor 130. A clamping frame 140 of construction similar to that of the clamping frame 40 of the embodiment of FIG. 1, includes a front frame section 148 and a rear frame section 150 pivotally coupled in end-to-end relationship to each other by a pivot pin 152. A plurality of pneumatically actuated clamps 158, 166 are carried by the respective front and rear frame sections 148, 150 as in the embodiment of FIG. 1. Locating sections 154, 162 carrying outwardly projecting locating rods 156, 164, are fixedly mounted on the front and rear sections 148, 150 in the same manner as in the FIG. 1 embodiment. When clamping frame 40 is in its clamping position shown in FIG. 3, the various locating rods 156, 164 are supported in V-shaped notches 170, 172 at the upper ends of support posts 174, 176 which are fixedly mounted in this instance upon sled 128. In the embodiment of FIG. 3, clamping frame 140 normally rests in the clamping position shown in FIG. 3 with its entire weight supported upon the sled by support posts 174, 176.

Slide frames 178, 180 are fixedly mounted upon sled 128 respectively at the front and rear ends of the sled. Slide members 182, 184 are mounted upon frames 178, 180 respectively for sliding movement along upwardly inclined paths. Rigid arms 186, 188 are respectively fixedly mounted upon the locating sections 154, 162 of the front and rear frame sections and are pivotally connected, as by pivots 190, 192 to the respective front and rear slide members 182, 184. Downwardly projecting abutments 194, 196 are respectively fixedly secured to slide members 182 and 184.

At both loading station 100 and unloading station 102 (FIG. 5) pneumatic cylinders are fixedly mounted below conveyor 130 upon a fixed frame member such as 202. When a sled 128 is located at either of loading station 100 or unloading station 102, the pneumatic cylinders 198, 200 at that station may be actuated to extend their piston rods to move the rods into engagement with abutments 194, 196 to drive the slide members 182, 184 upwardly along the sliding frames 178, 180 to the transfer position shown in FIG. 4. This elevates clamping frame 140 clear of the body B supported upon the sled so that the body may be loaded upon or unloaded from the sled from one side of the sled. Loading or unloading of the body is accomplished by fork lift type devices schematically illustrated at 108. In the embodiment of FIG. 3, clamping frame 140 is opened only during the step of loading or unloading the body B, and is returned to its normal position shown in FIG. 3 at the conclusion of the loading or unloading operation.

In the embodiment of FIG. 3, after the body B has been loaded upon the sled at loading station 100 (FIG. 5) and the clamping frame 140 returned to its closed position as in FIG. 3, the various pneumatically actuated clamps 158, 166 are pressurized from a pressure source 110 at loading station 100 which is connected temporarily to a self-sealing inlet such as 114, 116 (FIG. 3) on the clamping frame to pressurize the various clamp actuators. Upon disconnection of the pressure source, the fittings 114, 116 seal the pressure in the respective actuators and clamps remain closed. After the sled and its clamping frame have passed through welding station 102 and then advanced to unloading station 104, the pressure actuated clamps are vented by temporarily connecting the self-sealing fittings 114, 116 to a venting device 112, thereby releasing all the clamps to permit the clamping frame to be disengaged and raised to the position shown in FIG. 4 to accommodate unloading of the body. The pneumatic clamp actuators remain vented until the clamping frame is returned to the loading station 100 to be repressurized as described above.

As compared to the embodiment of FIG. 1, the embodiment of FIG. 3 would normally require at least four sled-clamping frame units for production line operation. One unit would be located at the loading station to receive a loosely assembled body, a second unit would be located at the welding station for performance of the welding operation, a third unit would be located at the unloading station for unloading of the welded body, and a fourth unit would be traveling along the return path from the unloading station to the loading station. However, such a system is readily adapted to handle different body configurations because each sled is provided with its own clamping frame, and the robotic welders may be easily programmed to perform the required different weld patterns. Where the conveyor system includes one or more storage sections, sleds carrying clamping frames of different configurations may be stored to be withdrawn in the desired sequence.

While one embodiment of the invention has been described in detail, it will be apparent to those skilled in the art the disclosed embodiments may be modified. Therefore, the foregoing description is to be considered exemplary rather than limiting, and the true scope of the invention is that defined in the following claims.

What is claimed is:

1. Framing apparatus for clamping the loosely assembled floor panel, side panels and header members of a vehicle body subassembly having a front to rear axis in an accurately oriented relationship to said front to rear axis and to each other for welding into a permanently assembled substantially rigid subassembly, said apparatus comprising conveyer means including a carrier movable along a predetermined path to and from a welding station, floor panel support means on said carrier for supporting the floor panel of said body subassembly in a predetermined fixed relationship to said carrier with said front to rear axis of said body subassembly parallel to said path, means at said welding station for locating said carrier and the body subassembly thereon in a predetermined welding pattern, a clamping frame assembly including a front frame section having a front and a rear end and a rear frame section having a front and a rear end, pivot means pivotally connecting the rear end of said front frame section to the front end of said rear frame section for pivotal movement about a horizontal axis overlying and normal to said predetermined path, support post means engageable with the front end of said front frame section and the rear end of said rear frame section and operable when said carriage and the body subassembly by therein is at said welding position to support said clamping frame assembly in an operating position overlying said body subassembly from front to rear, releasable clamp means on said front and rear frame sections operable when said clamping frame assembly is in said operating position to clamp said side panels and said header members into said accurately oriented relationship to each other and to said floor panels, and clamping frame actuating means operable where said clamp means are released for pivoting said front and rear frame sections upwardly away from said body subassembly to locate said clamping assembly in a transfer position clear of said body subassembly.

2. The invention defined in claim 1 wherein said support post means and said clamping frame are mounted upon said carrier for movement therewith along said conveying means.

3. The invention defined in claim 2 wherein said conveying means is operable to locate said carrier at a loading station located upstream of said path from said welding station, and said actuating means comprises power means at said unloading station operable to shift the clamping frame on a carrier at said loading station between its operating position and its transfer position, said frame when in said transfer position accommodating loading of a loosely assembled body assembly onto said floor panel support means of said carrier from one side of said conveying means.

4. The invention defined in claim 2 wherein said conveying means is operable to locate said carrier at an unloading location downstream of said path from said welding station, and said actuating means comprises power means at said unloading station operable to shift the clamping frame on a carrier at said unloading station between its operating position and its transfer position, said clamping frame when in said transfer position accommodating unloading of a body assembly from said floor panel support means of said carrier to one side of said conveying means.

5. The invention defined in claim 2 wherein said carrier comprises front and rear slide means mounted on said carrier adjacent the respective front and rear ends thereof for sliding movement along respective upwardly and forwardly and upwardly and rearwardly inclined paths, means at the front end of said front frame section coupling said front frame section to said front slide means for pivotal movement about a front axis parallel to said horizontal axis of said pivot means, and means at the rear end of said rear frame section coupling said rear frame section to said rear slide means for pivotal movement about a rear axis parallel to said horizontal axis of said pivot means, said front and rear axes lying in a common horizontal plane at equal distances from said horizontal axis.

6. The invention defined in claim 5 further comprising support rods projecting horizontally outwardly from opposite sides of said front and rear frame sections adjacent the respective front and rear ends thereof, said rods being located at equal distances from said horizontal axis, and said support post means comprises rigid support posts fixedly mounted on and projecting upwardly from said carrier and respectively located at opposite sides of said carrier adjacent each of the front and rear ends of said carrier, and means defining upwardly opening recesses in the upper ends of said post adapted to receive said support rods and support said rods in a common horizontal plane when said clamping frame is in said operating position.

7. The invention defined in claim 5 wherein said actuating means comprises reciprocatory motor means mounted adjacent said path at a transfer station spaced from said welding station, said motor means including front and rear pusher members reciprocable along respective paths respectively parallel to paths of movement of said front and rear slide means, said front and rear pusher members being movable into and out of abutment with the respective front and rear slide means to drive said slide means in movement along their respective paths when said carrier is located at said transfer station.

8. The invention defined in claim 1 wherein said clamping frame actuating means comprises suspension means located at said welding station operable to shift said clamping frame between said operating and said transfer position, said support posts means being located at fixed positions at opposite sides of said conveyor means.

9. The invention defined in claim 8 wherein said suspension means includes means coupled to said front and rear frame sections for selectively simultaneously raising or lowering said frame sections while accommodating pivotal movement of said frame sections relative to each other about said axis, support rods fixedly mounted at the front end of said front frame section and at the rear end of said rear frame section projecting horizontally outwardly from each side of said frame section, said support post means having support rod receiving recesses for locating and fixedly supporting said support rods when said clamping frame assembly is in said operating position.

10. The invention defined in claim 9 further comprising cam surface means on said support post means for guiding said support rods during movement of said clamping frame assembly between said operating and transfer position.

* * * * *

UNITED STATES PATENT AND TRADEMARK OFFICE
CERTIFICATE OF CORRECTION

PATENT NO. : 5,011,068

DATED : April 30, 1991

INVENTOR(S) : Robert R. Stoutenburg, et al

It is certified that error appears in the above-identified patent and that said Letters Patent is hereby corrected as shown below:

In the Abstract, line 6, delete "assembly" and insert --assembled--.

In the Abstract, line 20, delete "the" and insert --and--.

Column 1, line 45, delete "by" and insert --be--.

Column 1, line 66, delete "past" and insert --pass--.

Column 3, line 10, after "operation" insert --is--.

Column 4, line 19, after "4;" insert --and--.

Column 4, line 31, after "and" insert --20. Also shown is a rear window opening--.

Column 4, line 36, after "etc." insert --may be performed.--.

Column 4, line 48, delete "inner" and insert --inter--.

Column 5, line 10, delete "side" and insert --sides--.

Column 5, line 60, before "the" insert --in--.

UNITED STATES PATENT AND TRADEMARK OFFICE
CERTIFICATE OF CORRECTION

PATENT NO. : 5,011,068

DATED : April 30, 1991

INVENTOR(S) : Robert R. Stoutenburg, et al

It is certified that error appears in the above-identified patent and that said Letters Patent is hereby corrected as shown below:

Claim 8, line 40, delete "posts" and insert --post--.

Claim 10, line 60, delete "position" and insert --positions--.

Signed and Sealed this

First Day of December, 1992

Attest:

DOUGLAS B. COMER

Attesting Officer

Acting Commissioner of Patents and Trademarks